(12) United States Patent
Yang (10) Patent No.: US 9,906,635 B2
(45) Date of Patent: Feb. 27, 2018

(54) MOBILE TERMINAL AND METHOD FOR THE MOBILE TERMINAL TO SWITCH BETWEEN MICROPHONES DURING A CALL

(71) Applicant: Huizhou TCL Mobile Communication Co., Ltd, Huizhou, Guangdong (CN)

(72) Inventor: Yan Yang, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 0 days.

(21) Appl. No.: 15/302,046

(22) PCT Filed: Apr. 7, 2016

(86) PCT No.: PCT/CN2016/078632
§ 371 (c)(1),
(2) Date: Oct. 5, 2016

(87) PCT Pub. No.: WO2017/005022
PCT Pub. Date: Jan. 12, 2017

(65) Prior Publication Data
US 2017/0180527 A1    Jun. 22, 2017

(30) Foreign Application Priority Data

Jul. 8, 2015   (CN) .......................... 2015 1 0401933

(51) Int. Cl.
*H04M 1/60*   (2006.01)
*H04M 1/03*   (2006.01)
(Continued)

(52) U.S. Cl.
CPC ....... *H04M 1/6016* (2013.01); *G10L 21/0208* (2013.01); *H04M 1/03* (2013.01);
(Continued)

(58) Field of Classification Search
None
See application file for complete search history.

(56) References Cited

U.S. PATENT DOCUMENTS 9,635,257 B2 * 4/2017 Tisch ................. H04N 5/23258
9,706,303 B2 * 7/2017 Grokop .................... H04R 3/04
(Continued)

FOREIGN PATENT DOCUMENTS

| CN | 102316188 A | 1/2012 |
|---|---|---|
| CN | 105162950 A | 12/2015 |
| JP | 2013207515 A | 10/2013 |

OTHER PUBLICATIONS

International Search Report on corresponding PCT application (PCT/CN2016/078632) from International Searching Authority (CN) dated Jul. 1, 2016.

*Primary Examiner* — Paul Huber
(74) *Attorney, Agent, or Firm* — Andrew C. Cheng (57) ABSTRACT

A mobile terminal and a method for the mobile terminal to switch between microphones during a call are disclosed. The mobile terminal includes a sound source determining module, a switching module and at least two microphones, wherein the sound source determining module is configured to determine a sound source location when the mobile terminal is answering an incoming call, and the switching module is configured to switch between the at least two microphones according to the sound source location so as to control at least one of the at least two microphones to act as a primary microphone to receive a first sound signal emitted from the sound source location.

16 Claims, 5 Drawing Sheets

(51) Int. Cl.
 G10L 21/0208 (2013.01)
 H04M 1/725 (2006.01)
 H04R 3/00 (2006.01)
 H04R 25/00 (2006.01)
 G10L 21/0216 (2013.01)

(52) U.S. Cl.
 CPC ....... H04M 1/6008 (2013.01); H04M 1/6033 (2013.01); H04M 1/72569 (2013.01); H04R 3/005 (2013.01); H04R 25/407 (2013.01); H04R 25/43 (2013.01); G10L 2021/02165 (2013.01); H04R 2201/40 (2013.01); H04R 2410/01 (2013.01); H04R 2410/05 (2013.01); H04R 2499/11 (2013.01)

(56) References Cited

U.S. PATENT DOCUMENTS

| | | |
|---|---|---|
| 2010/0081487 A1 | 4/2010 | Chen et al. |
| 2011/0044478 A1 | 2/2011 | Qu |
| 2011/0275412 A1* | 11/2011 | Khawand ............ G06F 3/04847 455/566 |
| 2013/0216050 A1* | 8/2013 | Chen .................. G10L 21/0208 381/56 |
| 2013/0259221 A1* | 10/2013 | Shusaku ............. H04M 1/6016 379/390.01 |
| 2013/0279724 A1 | 10/2013 | Stafford et al. |
| 2014/0099992 A1* | 4/2014 | Burns .................... G06F 3/044 455/550.1 |
| 2014/0221048 A1* | 8/2014 | Kumor ................ H04M 1/6008 455/566 |

\* cited by examiner

MOBILE TERMINAL AND METHOD FOR THE MOBILE TERMINAL TO SWITCH BETWEEN MICROPHONES DURING A CALL

FIELD OF THE INVENTION

The present disclosure relates to the technical field of mobile terminals, and particularly, to a mobile terminal and a method for the mobile terminal to switch between microphones during a call.

BACKGROUND OF THE INVENTION

With the development and widespread use of smart terminals, mobile terminals such as mobile phones and tablet computers have become indispensable to people's life and greatly facilitate the users' daily life.

Usually a mobile terminal is provided with an earphone and a microphone at an upper end and a lower end thereof respectively. The microphone is used to receive sound information of the user and the earphone is used to play the sound information of the caller so as to accomplish the communication function. However, mobile terminals generally have a same or similar design; that is, the display screen occupies most of the front surface area of the mobile terminal and the upper end and the lower end of the mobile terminal are designed to be relatively symmetric with each other, which makes it difficult to identify the disposition direction of the mobile terminal. Consequently, a user who is to answer a call has to firstly identify whether the mobile terminal is being held in a correct direction, and otherwise the microphone located at the lower end would become far away from the sound source location to possibly cause distortion of the sound information received from the user. This is because that, if the sound of the user is distant from the microphone located at the lower end, the sound information acquired by the microphone or the sound information received by the caller via the communication device of the caller would be greatly affected to cause a significant difference from the actual sound information of the user. This might cause a communication barrier in the communication process.

Accordingly, the prior art technologies that requires identifying the direction of the mobile terminal before starting the communication cannot satisfy people's demand for making a call conveniently, clearly and accurately.

SUMMARY OF THE INVENTION

A primary technical problem to be solved in the present disclosure is to provide a mobile terminal and a method for the mobile terminal to switch between microphones during a call which allow for answering an incoming call without having to identify the direction of the mobile terminal. By determining a sound source location of the user, one of at least two microphones is controlled to receive the sound signal of the user so that a call can be made conveniently, clearly and accurately.

To solve the aforesaid technical problem, a first technical solution adopted in the present disclosure is to provide a mobile terminal, which comprises a processor, a storage, at least two microphones, at least two earphones and a bus, wherein the processor, the storage, the at least two microphones and the at least two earphones connect to the bus respectively, the storage is configured to store a program, and the processor is configured to execute the program; the program is configured to:

acquire an auricle image of a user when there is an incoming call for the mobile terminal;

determine a disposition direction in which the mobile terminal is disposed with respect to the user according to the auricle image, and determine a sound source location according to the disposition direction;

use some of the microphones that are located the closest to the sound source location as a primary microphone(s) to receive a first sound signal emitted from the sound source location; and determine an answering location of the user according to the auricle image, and switch between the at least two microphones according to the answering location so as to control some of the at least two earphones to act as a primary earphone(s) to play a second sound signal that is received.

In one embodiment, the mobile terminal further comprises a capacitive display screen or a camera, and the program is further configured to:

use the capacitive display screen or the camera to acquire the auricle image.

To solve the aforesaid technical problem, a second technical solution adopted in the present disclosure is to provide a mobile terminal, which comprises a sound source determining module, a switching module and at least two microphones, wherein the sound source determining module is configured to determine a sound source location when the mobile terminal is answering an incoming call, and the switching module is configured to switch between the at least two microphones according to the sound source location so as to control some of the at least two microphones to act as a primary microphone(s) to receive a first sound signal emitted from the sound source location.

In one embodiment, the mobile terminal further comprises an image acquiring module configured to acquire an auricle image of the user when the mobile terminal is answering the incoming call, and the sound source determining module is further configured to determine the sound source location of the user according to the auricle image.

In one embodiment, the sound source determining module determines a disposition direction in which the mobile terminal is disposed with respect to the user according to the auricle image and determines the sound source location according to the disposition direction, and the switching module takes some microphones located the closest to the sound source location as the primary microphone(s).

In one embodiment, the mobile terminal further comprises at least two earphones, the sound source determining module is further configured to determine an answering location of the user according to the auricle image, and the switching module is configured to switch between the at least two earphones according to the answering location so as to control some of the at least two earphones to act as a primary earphone(s) to play a second sound signal that is received.

In one embodiment, the image acquiring module is further configured to use a capacitive display screen or a camera of the mobile terminal to acquire the auricle image of the user.

To solve the aforesaid technical problem, a third technical solution adopted in the present disclosure is to provide a method for a mobile terminal to switch between microphones during a call, the mobile terminal comprising at least two microphones, and the method comprising the following blocks: determining a sound source location of a user when there is an incoming call for the mobile terminal; switching between the at least two microphones according to the sound source location so as to control some of the at least two microphones to act as a primary microphone(s) to receive a first sound signal emitted from the sound source location.

In one embodiment, the block of determining a sound source location of a user when there is an incoming call for the mobile terminal comprises: acquiring an auricle image of the user when there is the incoming call for the mobile terminal; and determining the sound source location of the user according to the auricle image.

In one embodiment, the block of determining the sound source location of the user according to the auricle image comprises: determining a disposition direction in which the mobile terminal is disposed with respect to the user according to the auricle image, and determining the sound source location according to the disposition direction; and the block of switching between the at least two microphones according to the sound source location so as to control some of the at least two microphones to act as a primary earphone(s) to receive a first sound signal emitted from the sound source location comprises: using some of the microphones that are located the closest to the sound source location as a primary microphone(s) to receive the first sound signal emitted from the sound source location.

In one embodiment, the mobile terminal further comprises at least two earphones, and the method further comprises the following blocks: determining an answering location of the user according to the auricle image; switching between the at least two earphones according to the answering location so as to control some of the at least two earphones to act as a primary earphone(s) to play a second sound signal that is received.

In one embodiment, the block of acquiring an auricle image of the user comprises: using a capacitive display screen or a camera of the mobile terminal to acquire the auricle image of the user.

The present disclosure has the following benefits: the mobile terminal provided in the present disclosure comprises a sound source determining module, a switching module and at least two microphones, wherein the sound source determining module is configured to determine a sound source location when the mobile terminal is answering an incoming call, and the switching module is configured to switch between the at least two microphones according to the sound source location so as to control some of the at least two microphones to act as a primary microphone(s) to receive a first sound signal emitted from the sound source location. As compared to prior art technologies which require identifying the direction of the mobile terminal before starting the communication, the mobile terminal that is answering an incoming call determines the sound source location of the user to control some of the at least two microphones to receive the sound signal of the user, and this allows for making a call conveniently, clearly and accurately without having to manually identify the direction of the mobile terminal.

DETAILED DESCRIPTION OF THE INVENTION

To make the technical problems to be solved, the technical solutions and the benefits of the present disclosure clearer and more apparent, the present disclosure will be further detailed hereinbelow with reference to the attached drawings and embodiments thereof. It should be understood that, the specific embodiments described herein are only used to explain but not to limit the present disclosure.

Figure 1:
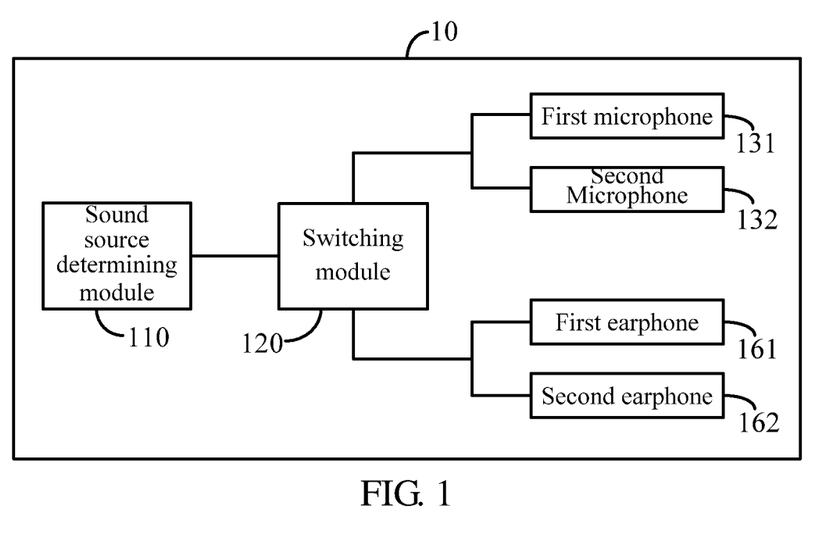
FIG. 1 is a schematic block diagram of one embodiment of a mobile terminal according to the present disclosure.

Referring to FIG. 1, there is shown a schematic block diagram of one embodiment of a mobile terminal according to the present disclosure. As shown in FIG. 1, the mobile terminal 10 may comprise a sound source determining module 110, a switching module 120, at least two microphones (illustrated in FIG. 1 as two microphones, e.g., a first microphone 131 and a second microphone 132), and at least two earphones (illustrated in FIG. 1 as two earphones, e.g., a first earphone 161 and a second earphone 162). The sound source determining module 110 may be configured to determine a sound source location of the user when the mobile terminal 10 is answering an incoming call, and the switching module 120 is configured to switch between the at least two microphones (e.g., the first microphone 131 and the second microphone 132) according to the sound source location so as to control some of the at least two microphones (e.g., the first microphone 131 and the second microphone 132) to act as a primary microphone(s) to receive a first sound signal emitted from the sound source location. Further, the sound source determining module 110 may be further configured to determine an answering location of the user, and the switching module 120 is configured to switch between the at least two earphones (e.g., the first earphone 161 and the second earphone 162) according to the answering location so as to control some of the at least two earphones (e.g., the first earphone 161 and the second earphone 162) to act as a primary earphone(s) to play a second sound signal that is received. As will be understood by those skilled in the art, the number of the microphones and that of the earphones are not limited to be two, but may be any number not less than two. As will be understood by those skilled in the art, the mobile terminal of the present disclosure may be provided with only at least two microphones or only at least two earphones, in which case the sound source determining module 110 switches only between the microphones or only between the earphones.

The mobile terminal 10 may be selected from, but is not limited to, a mobile phone, a tablet computer, a palmtop or the like device that can be conveniently carried about.

Figure 2:
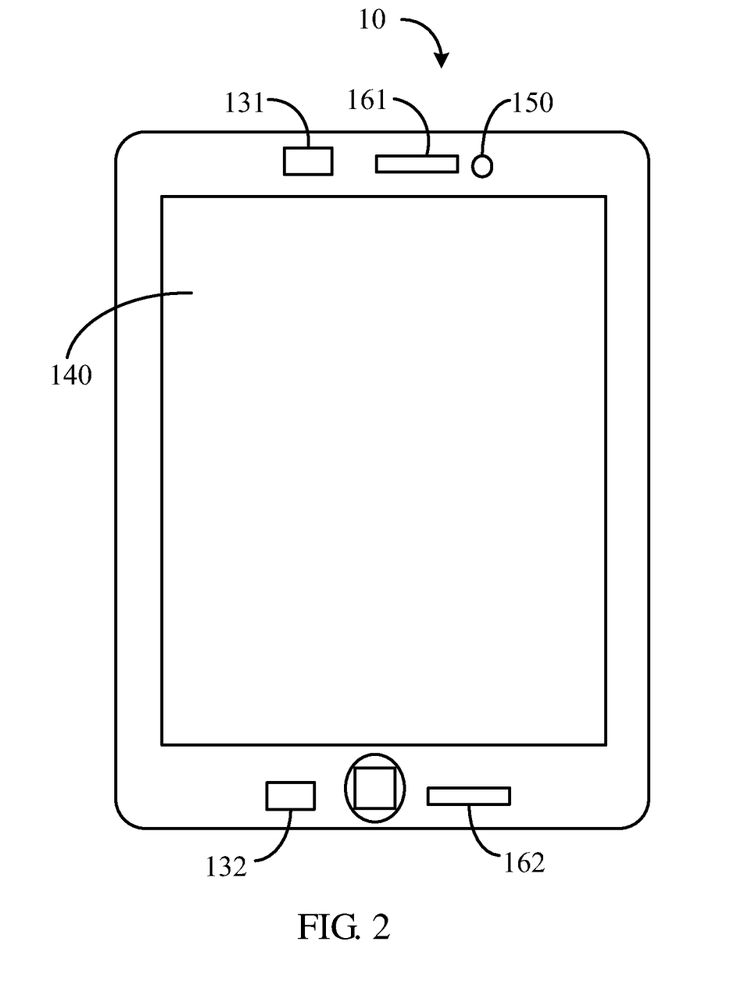
FIG. 2 is a schematic structural diagram illustrating relative positional relationships of the microphones and the earphones in the mobile terminal shown in FIG. 1.

Referring to FIG. 2, there is shown a schematic structural diagram illustrating relative positional relationships of the microphones and the earphones in the mobile terminal shown in FIG. 1. As shown in FIG. 2, the mobile terminal 10 may further comprise a display screen 140 (e.g., a capacitive display screen) and a front-mounted camera 150.

As shown in FIG. 2, the first microphone 131, the front-mounted camera 150, and the first earphone 161 may be located at an upper end of the mobile terminal 10 or the capacitive display screen 140, and the second microphone 132 and the second earphone 162 may be located at a lower end of the mobile terminal 10 or the capacitive display screen 140.

Specifically, when the mobile terminal 10 as shown in FIG. 1 and FIG. 2 answers an incoming call, the sound source determining module 110 determines a sound source location of the user, optionally by determining volume levels of the first sound signals or other sound signals received by the first microphone 131 and the second microphone 132 respectively. If the volume level received by the first microphone 131 is higher than that received by the second microphone 132, the sound source determining module 110 determines that the sound source location of the user is closer to the first microphone 131 than to the second microphone 132, and otherwise, determines that the sound source location is closer to the second microphone 132. The switching module 120 switches between the first microphone 131 and the second microphone 132 according to the sound source location so as to control one of the first microphone 131 and the second microphone 132 to act as a primary microphone to receive the first sound signal emitted from the sound source location. Specifically, when it is determined that the sound source location of the user is located closer to the first microphone 131, then the first microphone 131 is controlled to act as the primary microphone to receive the first sound signal emitted from the sound source location and, optionally, the second microphone 132 is turned off or is used to receive the ambient noise so that the first sound signal can be transmitted to the communication device of the caller more clearly. Likewise, if it is determined that the sound source location of the user is located closer to the second microphone 132, then the second microphone 132 is controlled to act as the primary microphone to receive the first sound signal emitted from the sound source location and, optionally, the first microphone 131 is turned off or is used to receive the ambient noise.

Optionally in other embodiments, the way in which the sound source determining module 110 determines the sound source location is not limited to the aforesaid way. For example, optionally the sound source location of the user may be determined by determining volume levels of the first sound signals or other sound signals received by a first sound transducer located at a first location near the first microphone 131 and a second sound transducer located at a second location near the second microphone 132; because this is similar to the aforesaid way of determining the sound source location, it will not be further described herein. Further, optionally, a direction of the mobile terminal 10 may be determined by the sound source determining module 110 via an acceleration sensor of the mobile terminal 10 so as to resolve the sound source location of the user. For example, if the mobile terminal 10 is determined to be in a upright state as shown in FIG. 2, then it is resolved that the sound source location of the user is closer to the second microphone 132 located at the lower end and, correspondingly, the switching module 120 controls the second microphone 132 to act as the primary microphone; and if the mobile terminal 10 is determined to be in a reversed state, then it is resolved that the sound source location of the user is closer to the first microphone 131 located at the upper end and, correspondingly, the switching module 120 controls the first microphone 131 to act as the primary microphone.

Further, when the sound source module 110 determines that the sound source location of the user is closer to the first microphone 131, it can be inferred that the answering location of the user is closer to the second earphone 162 than to the first earphone 161; and when the sound source module 110 determines that the sound source location of the user is closer to the second microphone 132, it can be inferred that the answering location of the user is closer to the first earphone 161 than to the second earphone 162. Then, the first earphone 161 or the second earphone 162 that is closer to the answering location is chosen to play the second sound signal received.

Figure 3:
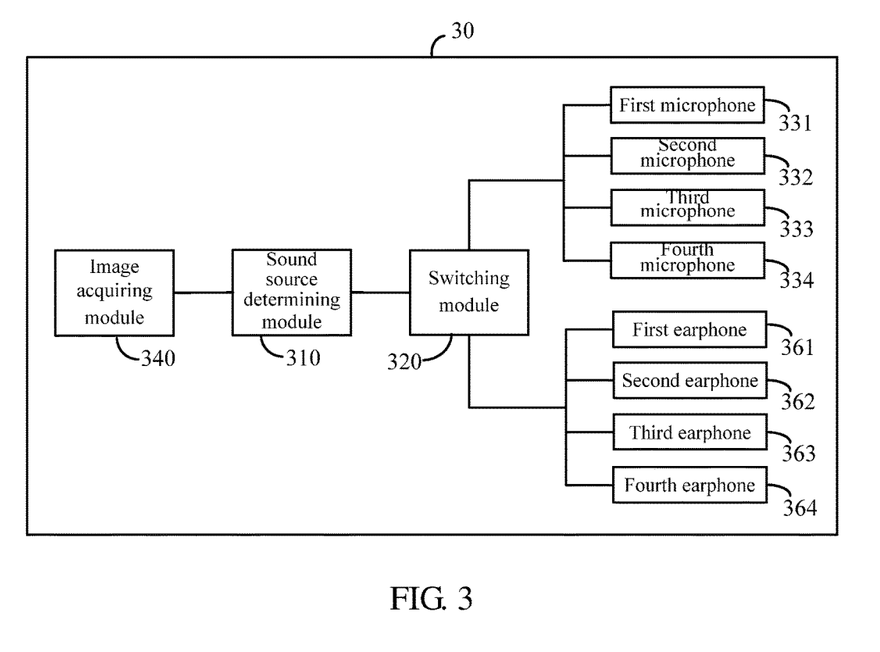
FIG. 3 is a schematic block diagram of another embodiment of the mobile terminal according to the present disclosure.

Referring to FIG. 3, there is shown a schematic block diagram of another embodiment of the mobile terminal according to the present disclosure. As shown in FIG. 3, the mobile terminal 30 may comprise a sound source determining module 310, a switching module 320, at least two microphones (illustrated in FIG. 3 as four microphones, e.g., a first microphone 331, a second microphone 332, a third microphone 333 and a fourth microphone 334) and at least two earphones (illustrated in FIG. 3 as four earphones, e.g., a first earphone 361, a second earphone 362, a third earphone 363 and a fourth earphone 364). Structures and functions of the sound source determining module 310 and the switching module 320 are identical to those of the sound source determining module 110 and the switching module 120 of the aforesaid embodiment, so they will not be further described herein. The mobile terminal 30 may further comprise an image acquiring module 340. The image acquiring module 340 may be configured to acquire an auricle image of the user when there is an incoming call for the mobile terminal 30, and the sound source determining module 310 may be further configured to determine the sound source location and the answering location of the user according to the auricle image.

The sound source determining module 310 determines a disposition direction in which the mobile terminal 30 is disposed with respect to the user according to the auricle image, and determines the sound source location or the answering location according to the disposition direction; and the switching module 320 takes some of the microphones that are located the closest to the sound source location as a primary microphone(s) and may further take some of the earphones that are located the closest to the answering location as a primary earphone(s). As will be understood by those skilled in the art, the mobile terminal of the present disclosure may be provided with only at least two microphones or only at least two earphones, in which case the sound source determining module 310 switches only between the microphones or only between the earphones.

Figure 4:
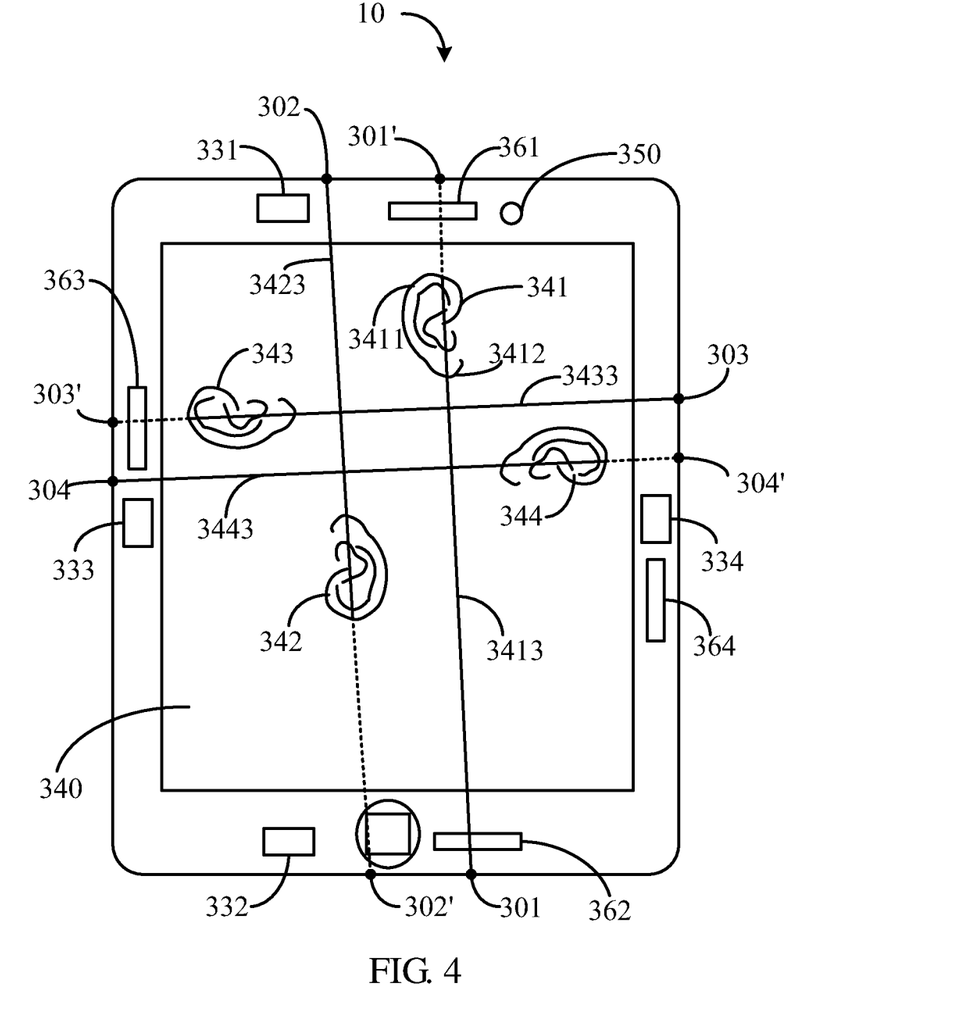
FIG. 4 is a schematic structural diagram illustrating relative positional relationships of the microphones and the earphones in the mobile terminal shown in FIG. 3.

Referring to FIG. 4, there is shown a schematic structural diagram illustrating relative positional relationships of the microphones and the earphones in the mobile terminal shown in FIG. 3. As shown in FIG. 4, the mobile terminal 30 may further comprise a display screen 340 (e.g., a capacitive display screen) and a front-mounted camera 350. FIG. 4 illustrates that the first microphone 331, the first earphone 361 and the front-mounted camera 350 are located at an upper end of the mobile terminal 30 or the capacitive display screen 340, the second microphone 332 and the second earphone 362 are located at a lower end of the mobile terminal 30 or the capacitive display screen 340, the third microphone 333 and the third earphone 363 are located at a left side of the mobile terminal 30 or the capacitive display screen 340, and the fourth microphone 334 and the fourth earphone 364 are located at a right side of the mobile terminal 30 or the capacitive display screen 340.

The sound source determining module 310 determines a disposition direction in which the mobile terminal 30 is disposed with respect to the user according to the auricle image, and determines the sound source location or the answering location according to the disposition direction. Specifically, the sound source determining module 310 determines a profile curve of the helix and a profile curve of the earlobe according to the auricle image 341 and determines the disposition direction of the mobile terminal 30 with respect to the user according to positional relationships between a line connecting the helix and the earlobe with respect to the mobile terminal 30. For example, the sound source location is determined according to an intersection between the connecting line from the helix to the earlobe (e.g., a connecting line from apex of the helix to the nadir of the earlobe) and an edge of the mobile terminal 30, and the answering location is determined according to an intersection of a reverse extension line of the connecting line from the helix to the earlobe (e.g., a line connecting the apex of the helix and the nadir of the earlobe) with an edge of the mobile terminal 30.

As shown in FIG. 4, if a first auricle image 341 comprising such features as the helix 3411 and the earlobe 3412 is acquired by the image acquiring module 340 and the sound source determining module 310 determines that the mobile terminal 30 is held in an upright direction according to the first auricle image 341 (specifically, according to a fact that there is an intersection 301 between a connecting line 3413 from the apex of the helix 3411 to the nadir of the earlobe 3412 and an edge (which is specifically a lower edge) of the mobile terminal 30), then it is considered that the mobile terminal 30 is being held in the normal upright direction. Then, the sound source determining module 310 determines the sound source location according to the disposition direction of the mobile terminal and may choose the intersection 301 or a location therearound as the sound source location, and the switching module 320 takes the second microphone 332 that is located the closest to the sound source location (e.g., the intersection 301) as the primary microphone.

As can be understood and as shown in FIG. 4, if a second auricle image 342 is acquired by the image acquiring module 340 and the sound source determining module 310 determines that the mobile terminal 30 is held in a reversed direction according to the second auricle image 342 (specifically, according to a fact that there is an intersection 302 between a connecting line 3423 from the apex of the helix to the nadir of the earlobe and an edge (which is specifically an upper edge) of the mobile terminal 30), then it is considered that the mobile terminal 30 is being held in the reversed direction. Then, the sound source determining module 310 determines the sound source location according to the disposition direction of the mobile terminal 30 and may choose the intersection 302 or a location therearound as the sound source location, and the switching module 320 takes the first microphone 331 that is located the closest to the sound source location (e.g., the intersection 302) as the primary microphone. If a third auricle image 343 is acquired by the image acquiring module 340 and the sound source determining module 310 determines that the mobile terminal 30 is held in a horizontal and backward direction according to the third auricle image 343 (specifically, according to a fact that there is an intersection 303 between a connecting line 3433 from the apex of the helix to the nadir of the earlobe and an edge (which is specifically a right edge) of the mobile terminal 30), then it is considered that the mobile terminal 30 is being held in the horizontal and backward direction. Then, the sound source determining module 310 determines the sound source location according to the horizontal and backward direction of the mobile terminal 30 and may choose the intersection 303 or a location therearound as the sound source location, and the switching module 320 takes the fourth microphone 334 that is located the closest to the sound source location (e.g., the intersection 303) as the primary microphone. Likewise, if a fourth auricle image 344 is acquired by the image acquiring module 340 and the sound source determining module 310 determines that the mobile terminal 30 is held in a horizontal and forward direction according to the fourth auricle image 344 (specifically, according to a fact that there is an intersection 304 between a connecting line 3443 from the apex of the helix to the nadir of the earlobe and an edge (which is specifically a left edge) of the mobile terminal 30), then it is considered that the mobile terminal 30 is being held in the horizontal and forward direction. Then, the sound source determining module 310 determines the sound source location according to the horizontal and forward direction of the mobile terminal 30 and may choose the intersection 304 or a location therearound as the sound source location, and the switching module 320 takes the third microphone 333 that is located the closest to the sound source location (e.g., the intersection 304) as the primary microphone.

After having controlled one of the at least two microphones to act as the primary microphone, the switching module 320 may optionally turn off other microphones or use the other microphones to receive the ambient noise so that the first sound signal can be transmitted to the communication device of the caller more clearly.

As shown in FIG. 4, the auricle images 341, 342, 343 or 344 may be a colored or monochromic image obtained by using a camera (e.g., the front-mounted camera 350) to photograph the auricle, or may be a capacitance profile obtained by using the capacitive display screen 34 to detect capacitance of the auricle, and the image acquiring module 340 is further configured to use the capacitive display screen 340 or the camera 350 of the mobile terminal 30 to acquire the auricle image of the user.

Further, the sound source determining module 310 may further determine the answering location of the user according to the auricle image, and the switching module 320 is configured to switch between the at least two earphones (e.g., the first earphone 361, the second earphone 362, the third earphone 363 and the fourth earphone 364) according to the answering location so as to control some of the at least two earphones (e.g., the first earphone 361, the second earphone 362, the third earphone 363 and the fourth earphone 364) to act as a primary earphone(s) to play a second sound signal received from the caller. Still referring to FIG. 4, the sound source determining module 310 further determines the answering location of the user according to the auricle image. For example, according to the first auricle image 341 (specifically, according to a fact that there is an intersection 301' between the a reverse extension line of a connecting line 3413 from the apex of the helix 3411 to the nadir of the earlobe 3412 and an edge (which is specifically the upper edge) of the mobile terminal 30), the sound source determining module 310 determines the intersection 301' or a location therearound as the answering location. The switching module 320 may be further configured to take the first earphone 361 that is located the closest to the answering location (e.g., the intersection 301') as the primary earphone. Likewise, for the second auricle image 342, the sound source determining module 310 further determines that there is an intersection 302' between the reverse extension line of a connecting line 3423 and an edge (which is specifically the lower edge) of the mobile terminal 30) and determines the intersection 302' or a location therearound as the answering location, and the switching module 320 is further configured to take the second earphone 362 that is located the closest to the answering location (e.g., the intersection 302') as the primary earphone; for the third auricle image 343, the sound source determining module 310 further determines that there is an intersection 303' between the reverse extension line of a connecting line 3433 and an edge (which is specifically a left edge) of the mobile terminal 30 and determines the intersection 303' or a location therearound as the answering location, and the switching module 320 is further configured to take the third earphone 363 that is located the closest to the answering location (e.g., the intersection 303') as the primary earphone; and for the fourth auricle image 344, the sound source determining module 310 further determines that there is an intersection 304' between the reverse extension line of a connecting line 3443 and an edge (which is specifically a right edge) of the mobile terminal 30 and determines the intersection 304' or a location therearound as the answering location, and the switching module 320 is further configured to take the fourth earphone 364 that is located the closest to the answering location (e.g., the intersection 304') as the primary earphone.

Optionally in other embodiments, the sound source determining module 310 takes the sound source location determined above as a mouth location, and according to positional relationships between the ears and the mouth, determines the ear location as the answering location, and then the switching module takes one of the earphones located the closest to the ear location as the primary earphone.

Figure 5:
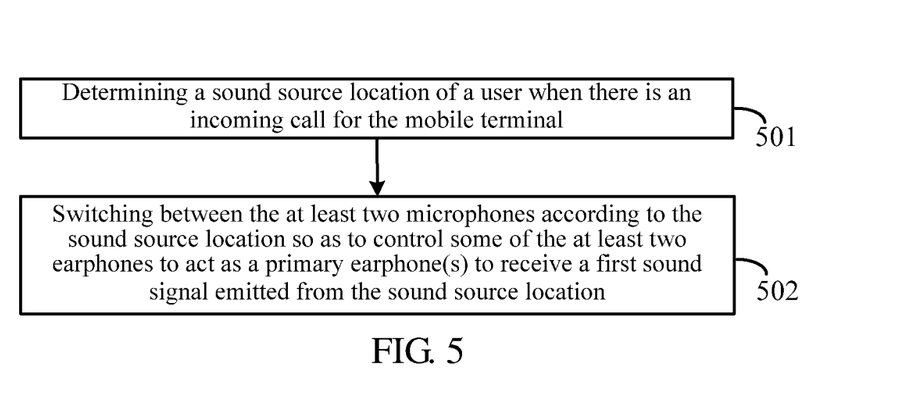
FIG. 5 is a schematic flowchart diagram of one embodiment of a method for a mobile terminal to switch between microphones during a call according to the present disclosure.

Referring to FIG. 5, there is shown a schematic flowchart diagram of an embodiment of a method for a mobile terminal to switch between microphones during a call according to the present disclosure. The mobile terminal comprises at least two microphones. The method may comprise the following blocks:

block 501: determining a sound source location of a user when there is an incoming call for the mobile terminal;

block 502: switching between the at least two microphones according to the sound source location so as to control some of the at least two earphones to act as a primary earphone(s) to receive a first sound signal emitted from the sound source location.

Here, the mobile terminal in this embodiment has the same structure as the mobile terminal 10 in the aforesaid one embodiment and the block 501 and the block 502 correspond to operations executed by the sound source determining module 110 and the switching module 120, so they will not be further described herein.

Figure 6:
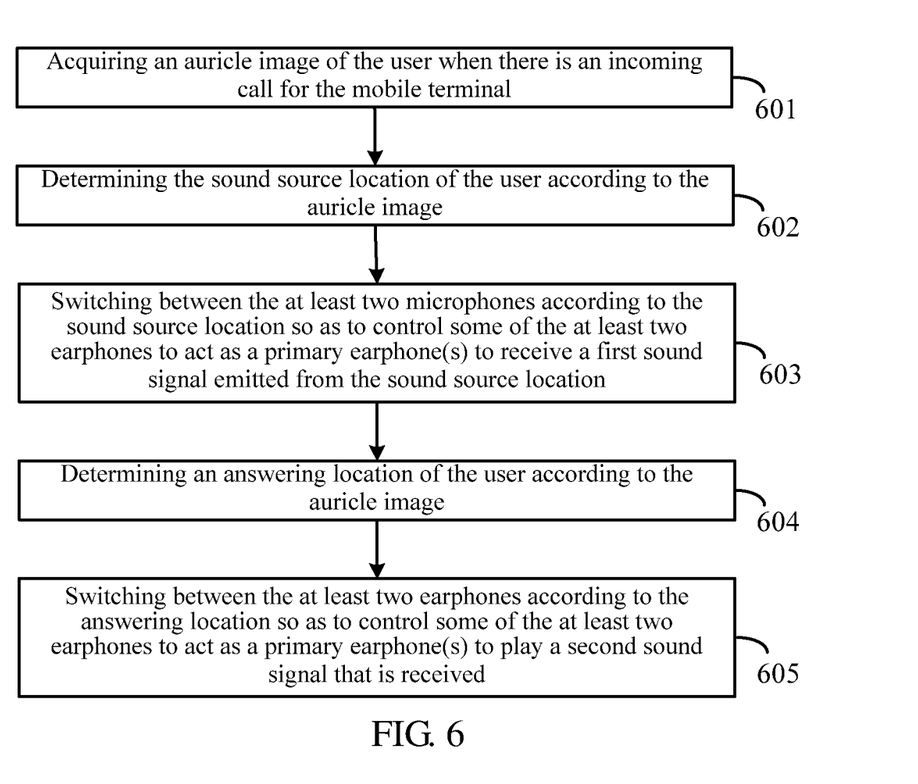
FIG. 6 is a schematic flowchart diagram of another embodiment of the method for a mobile terminal to switch between microphones during a call according to the present disclosure.

Referring to FIG. 6, there is shown a schematic flowchart diagram of another embodiment of the method for a mobile terminal to switch between microphones during a call according to the present disclosure. The mobile terminal comprises at least two microphones. The method may comprise the following blocks:

block 601: acquiring an auricle image of the user when there is an incoming call for the mobile terminal;

block 602: determining the sound source location of the user according to the auricle image;

block 603: switching between the at least two microphones according to the sound source location so as to control some of the at least two microphones to act as a primary microphone(s) to receive a first sound signal emitted from the sound source location.

Here, the mobile terminal in this embodiment has the same structure as the mobile terminal 30 in the aforesaid another embodiment and the block 601, the block 602 and the block 603 correspond to operations executed by the image acquiring module 340, the sound source determining module 310 and the switching module 320, so they will not be further described herein.

The block 602 may further comprise: determining a disposition direction in which the mobile terminal is disposed with respect to the user according to the auricle image, and determining the sound source location according to the disposition direction.

The block 603 may further comprise: using some of the microphones that are located the closest to the sound source location as a primary microphone(s) to receive the first sound signal emitted from the sound source location.

Here, the mobile terminal may further comprise at least two earphones, and the method may further comprise the following blocks:

block 604: determining an answering location of the user according to the auricle image; and block 605: switching between the at least two earphones according to the answering location so as to control some of the at least two earphones to act as a primary earphone(s) to play a second sound signal that is received.

The block 601 of acquiring an auricle image of the user comprises: using a capacitive display screen or a camera of the mobile terminal to acquire the auricle image of the user.

The present disclosure further discloses a mobile terminal, comprising: a processor, a storage, at least two microphones, at least two earphones, a capacitive display screen or a camera, and a bus, wherein the processor, the storage, the at least two microphones and the at least two earphones and the capacitive display screen or the camera connect to the bus respectively, the storage may be configured to store a program, and the processor may be configured to execute the program;

the program may be configured to:

acquire an auricle image of a user when there is an incoming call for the mobile terminal;

determine a disposition direction in which the mobile terminal is disposed with respect to the user according to the auricle image, and determine a sound source location according to the disposition direction;

use some of the at least two microphones that are located the closest to the sound source location as a primary microphone(s) to receive a first sound signal emitted from the sound source location; and determine an answering location of the user according to the auricle image, and switch between the at least two microphones according to the answering location so as to control some of the at least two earphones to act as a primary earphone(s) to play a second sound signal that is received.

The storage may include various media that can store program codes such as a USB flash disk, a mobile hard disk, a read-only memory (ROM), a random access memory (RAM), a magnetic disk or an optical disk; and the processor executes all or a part of the blocks of the method of each embodiment of the present disclosure.

As compared with the prior art, the mobile terminal provided in the present disclosure comprises a sound source determining module, a switching module and at least two microphones, wherein the sound source determining module is configured to determine a sound source location when the mobile terminal is answering an incoming call, and the switching module is configured to switch between the at least two microphones according to the sound source location so as to control some of the at least two microphones to act as a primary microphone(s) to receive a first sound signal emitted from the sound source location. Optionally, the sound source determining module determines the disposition direction in which the mobile terminal is disposed with respect to the user according to the auricle image, and the switching module takes some of the microphones that are located closest to the sound source location as the primary microphone according to the sound source location. As compared to prior art technologies which require identifying the direction of the mobile terminal before starting the communication, the mobile terminal that is answering an incoming call determines the sound source location of the user to control some of the microphones located the closest to the sound source location to receive the sound signal of the user, and this allows for making a call conveniently, clearly and accurately without having to manually identify the direction of the mobile terminal.

Preferred embodiments of the present disclosure have been described above with reference to the attached drawings, but this is not intended to limit the scope of the present disclosure. Any modifications, equivalent replacements and alterations that are made by those skilled in the art without departing from the scope and spirits of the present disclosure shall all be covered within the scope of the present disclosure.

What is claimed is:

1. A mobile terminal, comprising a processor, a storage, at least two microphones, at least two earphones and a bus, wherein the processor, the storage, the at least two microphones and the at least two earphones are connected to the bus, the storage is configured to store a program, and the processor is configured to execute a program configured to:
    acquire an auricle image of a user when an incoming call for the mobile terminal is received;
    determine a profile curve of a helix and a profile curve of an earlobe according to the auricle image, and determine a disposition direction of the mobile terminal with respect to the user according to positional relationships between a line connecting the profile curve of the helix and the profile curve of the earlobe with respect to the mobile terminal;
    determine a sound source location according to the disposition direction;
    use at least one microphone of the at least two microphones located closest to the sound source location as a primary microphone to receive a first sound signal emitted from the sound source location; and
    determine an answering location of the user according to the auricle image, and switch between the at least two microphones according to the answering location so as to control at least one earphone of the at least two earphones to act as a primary earphone to play a second sound signal that is received.

2. The mobile terminal according to claim 1, further comprising a capacitive display screen or a camera, and the program is further configured to:
    acquire the auricle image with the capacitive display screen or the camera.

3. A mobile terminal, comprising a sound source determining module, a switching module and at least two microphones, wherein the sound source determining module is configured to determine a sound source location when the mobile terminal is answering an incoming call, and the switching module is configured to switch between the at least two microphones according to the sound source location so as to control at least one microphone of the at least two microphones to act as a primary microphone to receive a first sound signal emitted from the sound source location;
    further comprising an image acquiring module configured to acquire an auricle image of the user when the mobile terminal is answering the incoming call;
    wherein the sound source determining module determines a profile curve of a helix and a profile curve of an earlobe according to the auricle image and determines a disposition direction of the mobile terminal with respect to the user according to positional relationships between a line connecting the profile curve of the helix and the profile curve of the earlobe with respect to the mobile terminal; and the sound source determining module is further configured to determine the sound source location of the user according to the auricle image.

4. The mobile terminal according to claim 3, wherein the switching module takes the at least one microphone located closest to the sound source location as the primary microphone.

5. The mobile terminal according to claim 3, wherein the mobile terminal further comprises at least two earphones, the sound source determining module is further configured to determine an answering location of the user according to the auricle image, and the switching module is configured to switch between the at least two earphones according to the answering location so as to control at least one earphone of the at least two earphones to act as a primary earphone to play a second sound signal that is received.

6. The mobile terminal according to claim 3, wherein the image acquiring module is further configured to acquire the auricle image of the user with a capacitive display screen or a camera of the mobile terminal.

7. The mobile terminal according to claim 5, wherein the at least two microphones comprise a first microphone, a second microphone, a third microphone and a fourth microphone, and the at least two earphones comprise a first earphone, a second earphone, a third earphone and a fourth earphone, the first microphone, the first earphone are located at an upper end of the mobile terminal or the capacitive display screen of the mobile terminal, the second microphone and the second earphone are located at a lower end of the mobile terminal or the capacitive display screen, the third microphone and the third earphone are located at a left side of the mobile terminal or the capacitive display screen, and the fourth microphone and the fourth earphone are located at a right side of the mobile terminal or the capacitive display screen.

8. The mobile terminal according to claim 3, wherein the mobile terminal comprises at least two microphones, the least two microphones comprise a first microphone and a second microphone, and the at least two earphones comprise a first earphone and a second earphone, the first microphone and the first earphone are located at an upper end of the mobile terminal or the capacitive display screen of the mobile terminal, and the second microphone and the second earphone are located at a lower end of the mobile terminal or the capacitive display screen.

9. The mobile terminal according to claim 8, wherein the sound source determining module determines the sound source location of the user by determining volume levels of the first sound signals received by the first microphone and the second microphone.

10. The mobile terminal according to claim 8, wherein the sound source determining module determines the sound source location of the user by determining volume levels of the first sound signals received by a first sound transducer located at a first location near the first microphone and a second sound transducer located at a second location near the second microphone.

11. The mobile terminal according to claim 8, wherein the direction of the mobile terminal is determined by the sound source determining module via an acceleration sensor of the mobile terminal so as to resolve the sound source location of the user, when the mobile terminal is determined to be in a upright state, then it is resolved that the sound source location of the user is closer to the second microphone located at the lower end and, correspondingly, the switching module controls the second microphone to act as the primary microphone; and when the mobile terminal is determined to be in a reversed state, then it is resolved that the sound source location of the user is closer to the first microphone located at the upper end and, correspondingly, the switching module controls the first microphone to act as the primary microphone.

12. A method for a mobile terminal to switch between microphones during a call, the mobile terminal comprising at least two microphones, the method comprising:
    acquiring an auricle image of a user when an incoming call for the mobile terminal is received;
    determining a profile curve of a helix and a profile curve of an earlobe according to the auricle image, and determining a disposition direction of the mobile terminal with respect to the user according to positional relationships between a line connecting the profile curve of the helix and the profile curve of the earlobe with respect to the mobile terminal;
    determining a sound source location according to the disposition direction; and switching between the at least two microphones according to the sound source location so as to control at least one microphone of the at least two microphones to act as a primary microphone to receive a first sound signal emitted from the sound source location.

13. The method according to claim 12, wherein
    switching between the at least two microphones according to the sound source location so as to control at least one microphone of the at least two microphones to act as the primary microphone to receive the first sound signal emitted from the sound source location comprises:
    receiving the first sound signal emitted from the sound source location by using the at least one microphone located to the sound source location as the primary microphone.

14. The method according to claim 12, wherein the mobile terminal further comprises at least two earphones, and the method further comprises:
    determining an answering location of the user according to the auricle image; and
    switching between the at least two earphones according to the answering location so as to control at least one earphone of the at least two earphones to act as a primary earphone to play a second sound signal that is received.

15. The method according to claim 12, wherein acquiring the auricle image of the user comprises:
    acquire the auricle image of the user with a capacitive display screen or a camera of the mobile terminal.

16. The method according to claim 12, wherein determining the sound source location of the user when an incoming call for the mobile terminal is received comprises:
    determining the sound source location of the user by determining volume levels of the first sound signals received by a first microphone of the at least two microphones and a second microphone of the at least two microphones.

* * * * *